United States Patent
Ezrielev et al.

(10) Patent No.: US 11,991,240 B2
(45) Date of Patent: May 21, 2024

(54) SYSTEM AND METHOD FOR REDUCTION OF DATA TRANSMISSION BY INFERENCE MODEL OPTIMIZATION

(71) Applicant: Dell Products L.P., Round Rock, TX (US)

(72) Inventors: Ofir Ezrielev, Be'er Sheva (IL); Jehuda Shemer, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 5 days.

(21) Appl. No.: 17/850,522

(22) Filed: Jun. 27, 2022

(65) Prior Publication Data
US 2023/0421629 A1     Dec. 28, 2023

(51) Int. Cl.
*H04L 67/10*     (2022.01)
*G06F 1/03*      (2006.01)
*G06N 5/04*      (2023.01)

(52) U.S. Cl.
CPC ............... *H04L 67/10* (2013.01); *G06F 1/03* (2013.01); *G06N 5/04* (2013.01)

(58) Field of Classification Search
CPC .............. H04L 67/10; G06F 1/03; G06N 5/04
USPC ...................................................... 709/201
See application file for complete search history.

(56) References Cited

U.S. PATENT DOCUMENTS

| | | | | |
|---|---|---|---|---|
| 2020/0193288 A1* | 6/2020 | Li | | G06N 3/045 |
| 2022/0188569 A1* | 6/2022 | Ananthanarayanan | | G06F 9/5083 |
| 2022/0224701 A1* | 7/2022 | Gutierrez | | H04J 3/0673 |
| 2022/0383149 A1* | 12/2022 | Cao | | G06N 7/01 |
| 2022/0414498 A1* | 12/2022 | da Silva | | G08G 1/00 |
| 2023/0052255 A1* | 2/2023 | He | | G06N 20/00 |
| 2023/0144662 A1* | 5/2023 | Tasinga | | G06F 9/5044 |
| | | | | 718/105 |

(Continued)

OTHER PUBLICATIONS

Lewandowski, M.; Płaczek, B.; Bernas, M.; Classifier-Based Data Transmission Reduction in Wearable Sensor Network for Human Activity Monitoring. Sensors 2021, 21, 85. https://doi.org/10.3390/s21010085.

(Continued)

*Primary Examiner* — Cheikh T Ndiaye
*Assistant Examiner* — Ayele F Woldemariam
(74) *Attorney, Agent, or Firm* — Womble Bond Dickinson (US) LLP

(57) ABSTRACT

Methods and systems for managing distribution of inference models throughout a distributed system are disclosed. To manage distribution of inference models, a system may include a data aggregator and one or more data collectors. The data aggregator may obtain a threshold, the threshold indicating an acceptable inference error rate for an inference model. The data aggregator may obtain an inference model based on the threshold by training an inference model, performing a lookup in an inference model lookup table, or via other methods. The data aggregator may optimize the inference model to determine the minimum quantity of computing resources consumed by an inference model in order to generate inferences accurate within the threshold. In order to do so, the data aggregator may simulate the operation of more computationally-costly inference models and less computationally-costly inference models.

20 Claims, 10 Drawing Sheets

(56) References Cited

U.S. PATENT DOCUMENTS

2023/0153648 A1* 5/2023 Ramanasankaran ... G06N 3/044 706/12

OTHER PUBLICATIONS

Le Borgne, Yann-Aël & Santini, Silvia & Bontempi, Gianluca. (2007). Adaptive model selection for time series prediction in wireless sensor networks. Signal Processing. 87. 3010-3020. 10.1016/j.sigpro.2007.05.015.

Ankur Jain, Edward Y. Chang, Yuan-Fang Wang; Adaptive stream resource management using Kalman Filters. SIGMOD '04: Proceedings of the 2004 ACM SIGMOD international conference on Management of data Jun. 2004 pp. 11-22 https://doi.org/10.1145/1007568.1007573.

X. Feng, X. Zhenzhen, Y. Lin, S. Weifeng and L. Mingchu, "Prediction-based data transmission for energy conservation in wireless body sensors," 2010 The 5th Annual ICST Wireless Internet Conference (WICON), 2010, pp. 1-9.

Tulone, Daniela & Madden, Samuel. (2006). An energy-efficient querying framework in sensor networks for detecting hode similarities. 191-300. 10.1145/1164717.1164768.

Lu, Qing & Jiang, Weiwen & Xu, Xiaowei & Shi, Yiyu & Hu, Jingtong. (2019). On Neural Architecture Search for Resource-Constrained Hardware Platforms.

"Detecting data drift on data sets," Web page <https://docs.microsoft.com/en-us/azure/machine-learning/how-to-monitor-datasets?tabs=python>, Nov. 10, 2021, retrieved from Internet Archive Wayback Machine <https://web.archive.org/web/20210420083010/https://docs.microsoft.com/en-us/azure/machine-learning/how-to-monitor-datasets?tabs=python> on Apr. 27, 2022).

A. Vaswani, N. Shazeer, N. Parmar, J. Uszkoreit, L. Jones, A. Gomez, L. Kaiser, and I. Polosukhin, "Attention Is All You Need", 31st Conference on Neural Information Processing Systems (NIPS 2017), Long Beach, CA, USA, pp. 1-15.

B. Lu, J. Yang, L. Chen, and S. Ren, "Automating Deep Neural Network Model Selection for Edge Inference", 2019 IEEE First International Conference on Cognitive Machine Intelligence (CogMI), 2019, pp. 184-193.

K. Singh, A. Verma, and L. Vig, "Deep Learning Based Network Similarity for Model Selection", Data Science 4, 2021, pp. 63-83, DOI 10.3233/DS-210033, IOS Press.

A. Krause, R. Rajagopal, A. Gupta, and C. Guestrin, "Simultaneous Placement and Scheduling of Sensors", Carnegie Mellon University, School of Computer Science, Machine Learning Department, Pittsburgh, PA, CMU-ML-08-114, Oct. 2008, pp. 1-28.

Pearl, Judea. "Causal inference in statistics: An overview." Statistics surveys 3 (2009): 96-146. https://projecteuclid.org/journals/statistics-surveys/volume-3/issue-none/Causal-inference-in-statistics-An-overview/10.1214/09-SS057.short.

Xie, Yaochen, et al. "Self-supervised learning of graph neural networks: A unified review." IEEE Transactions on Pattern Analysis and Machine Intelligence (2022). https://ieeexplore.ieee.org/abstract/document/9764632/.

Kumar, Manoj, et al. "Genetic algorithm: Review and application." Available at SSRN 3529843 (2010). https://papers.ssrn.com/sol3/papers.cfm?abstract_id=3529843.

* cited by examiner

SYSTEM AND METHOD FOR REDUCTION OF DATA TRANSMISSION BY INFERENCE MODEL OPTIMIZATION

FIELD

Embodiments disclosed herein relate generally to data collection. More particularly, embodiments disclosed herein relate to systems and methods to limit the transmission of data over a communication system during data collection.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
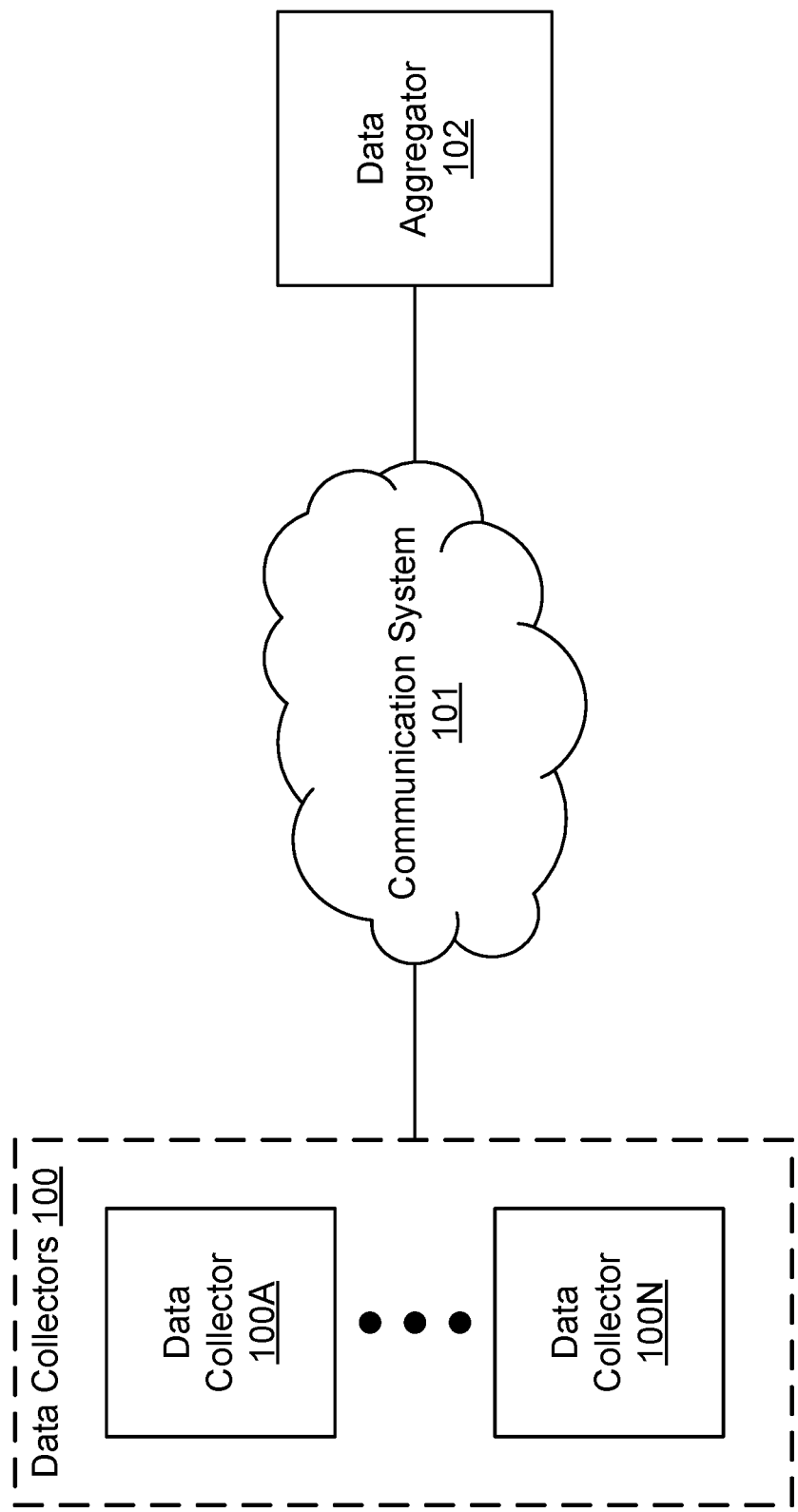
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data aggregation using inference models in a distributed environment. To manage aggregation of data, the system may include a data aggregator and one or more data collectors. The data aggregator and/or data collector may utilize an inference model to predict data based on future measurements performed by the data collector. The inferences may allow data representative of the data collected by the data collector to be aggregated in the data aggregator without sending copies of all of the data to the data aggregator thereby reducing computing resource expenditure for data aggregation.

However, operation of inference models may consume undesirable quantities of computing resources during operation. In order to conserve computing resources used to operate the inference models, the data aggregator may determine the least computationally-costly inference model that may still provide inferences for data collected by a data collector within a threshold for inference accuracy.

The data aggregator may obtain an inference model by, for example: (i) obtaining an inference model from an inference model lookup table and corresponding repository in which pre-trained inference models are stored, (ii) obtaining an inference model by training an inference model using training data, and/or (iii) obtaining a trained inference model from another entity throughout the distributed environment.

Prior to distributing the inference model to data collectors 100, the data aggregator may determine whether the inference model meets the threshold for inference accuracy by simulating operation of the inference model using synthetic data.

If the inference model meets the threshold for inference accuracy, the data aggregator may simulate operation of a less computationally-costly inference model to determine whether the less computationally-costly inference model may also meet the threshold. This method may continue until the data aggregator identifies an inference model that consumes a smallest quantity of computing resources while still providing accurate inferences (within the threshold).

In contrast, if the inference model does not meet the threshold for accuracy, the data aggregator may simulate operation of a more computationally-costly inference model to determine whether the more computationally-costly inference model may meet the threshold. This method may continue until the data aggregator determines the minimum quantity of computing resources that may be consumed by an inference model to obtain accurate inferences (within the threshold).

The inference model may be a twin inference model and a copy of the twin inference model may be distributed to the one or more data collectors. The one or more data collectors may utilize the copy of the twin inference model to obtain inferences intended to match data obtained by the one or more data collectors. The one or more data collectors may transmit a reduced-size representation of data (using the data and the inferences) during data collection. By doing so, data transmissions may be reduced, communication system bandwidth may be conserved, and computing resource consumption of the devices may be minimized throughout the system.

In an embodiment, a method for managing inference model distribution in a distributed environment where data is collected in a data aggregator of the distributed environment and from at least a data collector operably connected to the data aggregator via a communication system is provided.

The method may include obtaining, by the data aggregator, a threshold, the threshold indicating a maximum acceptable difference between: data expected to be collected by the data collector during a future period of time, and inferences for the data that will be obtained by the data collector and the data aggregator during the future period of time.

The method may also include obtaining, by the data aggregator, an inference model based on the threshold, the inference model being adapted to generate the inferences.

The method may also include distributing, by the data aggregator, the inference model to the data collector to facilitate twin inference generation by the data collector and the data aggregator, the twin inference generation facilitating aggregation of a portion of the data by the data aggregator without data transmission between the data collector and the data aggregator.

Obtaining the inference model based on the threshold may include: performing a lookup in an inference model lookup table using the threshold to obtain a result; based on the result: obtaining a list of inference models that meet the threshold, the list of inference models being a subset of all inference models referenced in the lookup table; and selecting an inference model from the list of inference models, the inference model having a lowest computational cost for operation of the inference models of the list of inference models.

The inference model lookup table may include entries, each of the entries may include an identifier for one of the inference models referenced in the lookup table, and each of the entries may be keyed to a corresponding threshold such that a lookup performed with a given threshold returns all entries keyed to that given threshold.

Obtaining the inference model based on the threshold may include: obtaining a provisional inference model; and optimizing the provisional inference model based on the threshold to obtain the inference model.

Optimizing the provisional inference model based on the threshold may include: simulating operation of the provisional inference model to obtain an inference error rate for the provisional inference model; making a determination regarding whether the inference error rate meets the threshold; in an instance where the determination indicates that the inference error rate does not meet the threshold: discarding the provisional inference model; and obtaining a second provisional inference model, the second provisional inference model consuming a larger quantity of computing resources for operation than the provisional inference model; in an instance where the determination indicates that the inference error rate does meet the threshold: obtaining a second provisional inference model, the second provisional inference model consuming a smaller quantity of computing resources for operation than the provisional inference model.

The method may also include: in the instance where the determination indicates that the inference error rate does meet the threshold: simulating operation of the second provisional inference model to obtain a second inference error rate for the second provisional inference model; making a second determination regarding whether the second inference error rate meets the threshold; in an instance where the second determination indicates that the second inference error rate does not meet the threshold: using the provisional inference model as the inference model; in an instance where the second determination indicates that the second inference error rate does meet the threshold: obtaining a third provisional inference model, the third provisional inference model consuming a smaller quantity of computing resources for operation than the second provisional inference model.

The method may also include: in the instance where the determination indicates that the inference error rate does not meet the threshold: simulating operation of the second provisional inference model to obtain a second inference error rate for the second provisional inference model; making a second determination regarding whether the second inference error rate meets the threshold; in an instance where the second determination indicates that the second inference error rate does not meet the threshold: discarding the second provisional inference model; and obtaining a third provisional inference model, the third provisional inference model consuming a larger quantity of computing resources for operation than the second provisional inference model; in an instance where the second determination indicates that the second inference error rate does meet the threshold: using the second provisional inference model as the inference model.

The provisional inference model may be obtained by training a new inference model or selecting an already trained inference model.

The method may also include obtaining, by the data aggregator, a portion of the data using a reduced-size representation of the portion of the data from the data collector without receiving the portion of the data from the data collector.

Obtaining the portion of the data may include: obtaining a twin inference; and reconstructing the portion of the data using the twin inference and the reduced-size representation of the portion of the data, the reduced-size representation of the portion of the data being based on a second twin inference corresponding to the twin inference and generated by the data collector.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize data aggregated from various sources (e.g., data collectors 100) throughout a distributed environment.

The system may include data aggregator 102. Data aggregator 102 may provide all, or a portion, of the computer-implemented services. For example, data aggregator 102 may provide computer-implemented services to users of data aggregator 102 and/or other computing devices operably connected to data aggregator 102. The computer-implemented services may include any type and quantity of services which utilize, at least in part, data aggregated from a variety of sources (e.g., data collectors 100) within a distributed environment.

For example, data aggregator 102 may be used as part of a control system in which data that may be obtained by data collectors 100 is used to make control decisions. Data such as temperatures, pressures, etc. may be collected by data collectors 100 and aggregated by data aggregator 102. Data aggregator 102 may make control decisions for systems using the aggregated data. In an industrial environment, for example, data aggregator 102 may decide when to open and/or close valves using the aggregated data. Data aggregator 102 may be utilized in other types of environments without departing from embodiments disclosed herein.

To facilitate data collection, the system may include one or more data collectors 100. Data collectors 100 may include any number of data collectors (e.g., 100A-100N). For example, data collectors 100 may include one data collector (e.g., 100A) or multiple data collectors (e.g., 100A-100N) that may independently and/or cooperatively provide data collection services.

For example, all, or a portion, of data collectors 100 may provide data collection services to users and/or other computing devices operably connected to data collectors 100. The data collection services may include any type and quantity of services including, for example, temperature data collection, pH data collection, humidity data collection, etc. Different systems may provide similar and/or different data collection services.

To aggregate data from data collectors 100, data aggregator 102 and/or data collectors 100 may host inference models to facilitate a reduction in the quantity of data transmitted over communication system 101 during data collection. For example, the inference models may be used to allow data aggregator 102 to predict data that will likely be obtained by data collectors 100, thereby entirely or partially eliminating the need for data collectors 100 to provide data aggregator 102 with copies of all obtained data for data aggregator 102 to have access to such data.

However, data aggregator 102 and/or data collectors 100 may have access to limited computing resources and, therefore, may desire to host an inference model configured to operate using the minimum quantity of computing resources while generating inferences within a threshold for inference accuracy (or at least a quantity in a lower portion of a range of computing resource consumption by inference models). In order to minimize (or reduce) the consumption of computing resources while maintaining a desired level of inference accuracy, data aggregator 102 may optimize inference models by simulating their operation using synthetic data.

In general, embodiments disclosed herein may provide methods, systems, and/or devices for managing the distribution of inference models throughout a distributed environment. To manage the distribution of inference models throughout a distributed environment, a system in accordance with an embodiment may perform inference model optimization prior to distributing the inference models throughout the distributed system. Inference model optimization may be performed by determining the least computationally-costly inference model capable of generating inferences within a threshold for inference accuracy. The threshold for inference accuracy may be based on an acceptable level of difference between data obtained by data collectors and the inferences generated by the inference model (without needing to send a copy of the collected data to ensure that the aggregator has access to a representation of the collected data of sufficient accuracy). By doing so, computing resources may be conserved and network transmissions may be limited during data collection.

To provide its functionality, data aggregator 102 may (i) obtain a threshold, the threshold being based on a maximum acceptable difference between data obtained by data collectors and inferences generated by an inference model, (ii) obtain an inference model based on the threshold (discussed in greater detail with respect to FIGS. 3B-3D), and (iii) distribute the inference model to the data collectors.

When performing its functionality, data aggregator 102 may perform all, or a portion, of the methods and/or actions shown in FIGS. 3A-3D.

To provide its functionality, data collectors 100 may (i) obtain data based on a measurement of interest to the data aggregator or other entity (e.g., a downstream consumer), and (ii) transmit a portion and/or representation of the data to data aggregator 102.

When performing its functionality, data collectors 100 may perform all, or a portion, of the methods and/or actions shown in FIGS. 3A-3D.

In an embodiment, data is aggregated using trained inference models to facilitate the reduction of data transmission. In order to reduce data transmissions during data collection, inference models may be hosted and operated by data aggregator 102 and/or data collectors 100, and trained to predict data based on measurements performed by data collectors 100. Two examples of data collection and aggregation utilizing inference models in accordance with an embodiment are described below. Inference models may be utilized to facilitate data collection and aggregation via other methods without departing from embodiments disclosed herein.

In a first example, data collectors 100 may obtain and transmit a data statistic (e.g., an average, a median, a mode, etc.) to data aggregator 102. Data aggregator 102 may host an inference model trained to predict data based on measurements performed by data collectors 100 and may obtain a complementary data statistic based on the inferences. If the data statistic matches the complementary data statistic within some threshold, the inference model may be determined accurate and the inferences may be stored as validated data. By doing so, full data sets may not be obtained by data aggregator 102 from data collectors 100 and, therefore, data transmissions may be reduced across communication system 101.

In a second example, identical copies of a trained twin inference model may be hosted by data aggregator 102 and data collectors 100 and, therefore, may generate identical inferences. Data collectors 100 may reduce network transmissions by generating a difference based on: (i) data based on measurements performed by the data collectors and (ii) inferences generated by the copy of the twin inference model hosted by the data collectors. If the difference falls below a threshold, the inference model may be determined accurate and the inferences may be stored as validated data. If the difference falls outside the threshold, data aggregator 102 may obtain the difference from data collectors 100 and may reconstruct data based on: (i) the difference and (ii) inferences generated by the copy of the twin inference model hosted by the data aggregator 102. Consequently, full and/or partial data sets may not be transmitted over communication system 101 and network bandwidth consumption may be reduced. As mentioned above, inference models may be utilized to facilitate the reduction of data transmissions during data collection via other methods without departing from embodiments disclosed herein.

While described with respect to the above examples, the inferences may be used to reduce data transmission via other methods without departing from embodiments disclosed herein.

Data collectors 100 and/or data aggregator 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data collectors 100 are implemented using an internet of things (IoT) device, which may include a computing device. The IoT device may operate in accordance with a communication model and/or management model known to the data aggregator 102, other data collectors, and/or other devices.

Any of the components illustrated in FIG. 1 may be operably connected to each other (and/or components not illustrated) with a communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

In an embodiment, the system of FIG. 1 may utilize both uplink (e.g., data aggregator to data collector) and downlink (e.g., data collector to data aggregator) pathways to transmit information throughout the distributed environment. In order to limit data transmission, reduced-size portions and/or representations of data may be transmitted rather than the data itself via these pathways. Further, to balance or improve the use of under-utilized pathways, data structures (e.g., thresholds for inference accuracy, copies of inference models, etc.) may be provided to the data collectors via the uplink pathways. Transmitting data via under-utilized uplink pathways may allocate the load on the system to more available pathways and facilitate a reduction in data transmissions overall throughout distributed environments.

While illustrated in FIG. 1 as included a limited number of specific components, a system in accordance with an embodiment may include fewer, additional, and/or different components than those illustrated therein.

Figure 2:
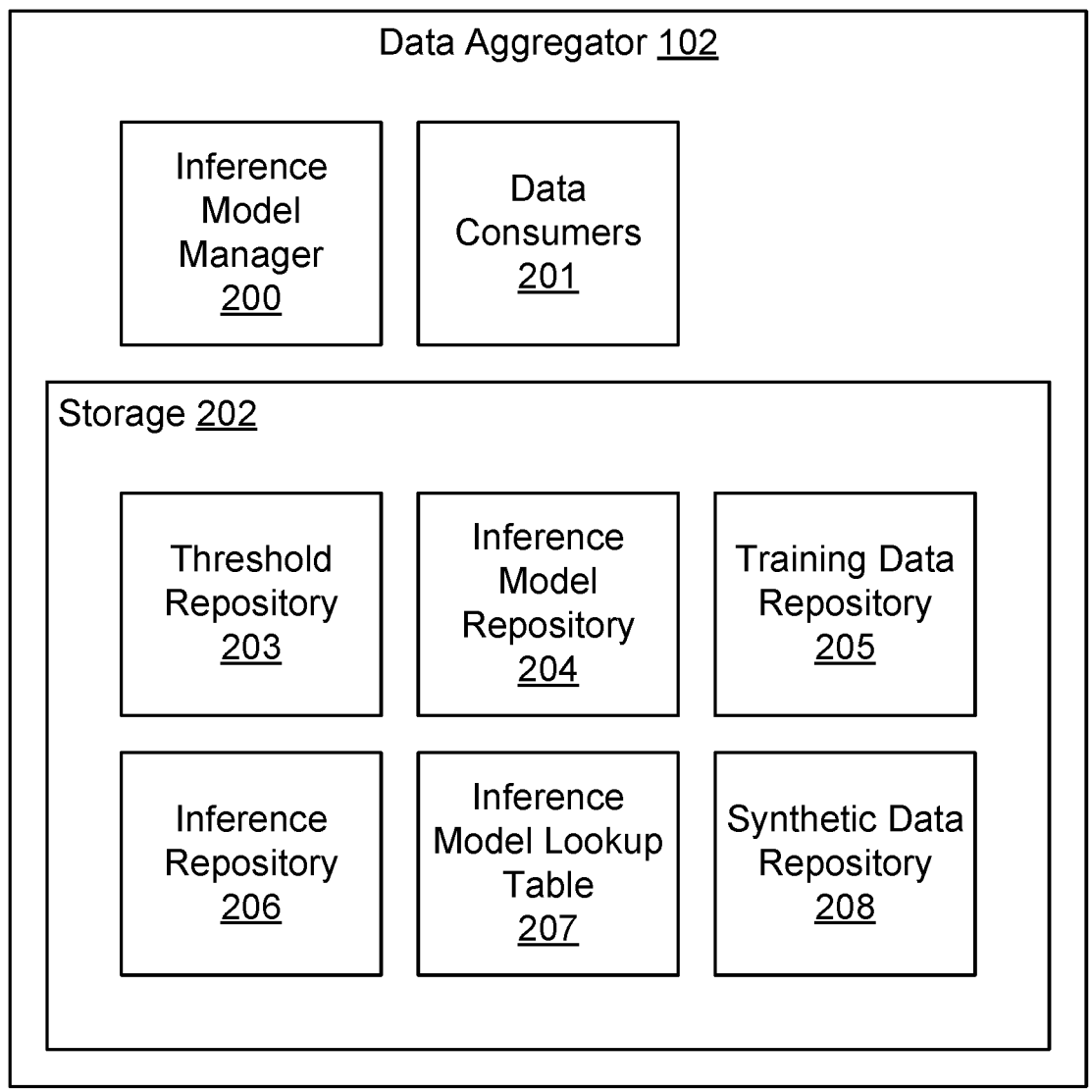
FIG. 2 shows a block diagram illustrating a data aggregator in accordance with an embodiment.

As discussed above, the system of FIG. 1 may include one or more data aggregators. Turning to FIG. 2, a diagram of data aggregator 102 in accordance with an embodiment is shown. Data aggregator 102 may provide computer-implemented services that utilize data aggregated from various sources (e.g., data collectors 100) within a distributed environment. In order to do so, data aggregator 102 may obtain a threshold for inference accuracy and obtain an inference model that meets the threshold while minimizing consumption of computing resources during operation. By doing so, inference models may be optimized for reduced-size data transmission throughout a distributed system. Consequently, the computational overhead may be reduced for data aggregator 102 and/or data collectors 100. To provide its functionality, data aggregator 102 may include inference model manager 200, data consumers 201, and/or storage 202. Each of these components is discussed below.

Inference model manager 200 may (e.g., to provide all, or a portion, of the computer-implemented services) (i) obtain a threshold, (ii) obtain an inference model based on the threshold, and (iii) distribute the inference model to data collectors 100.

Figure 3A:
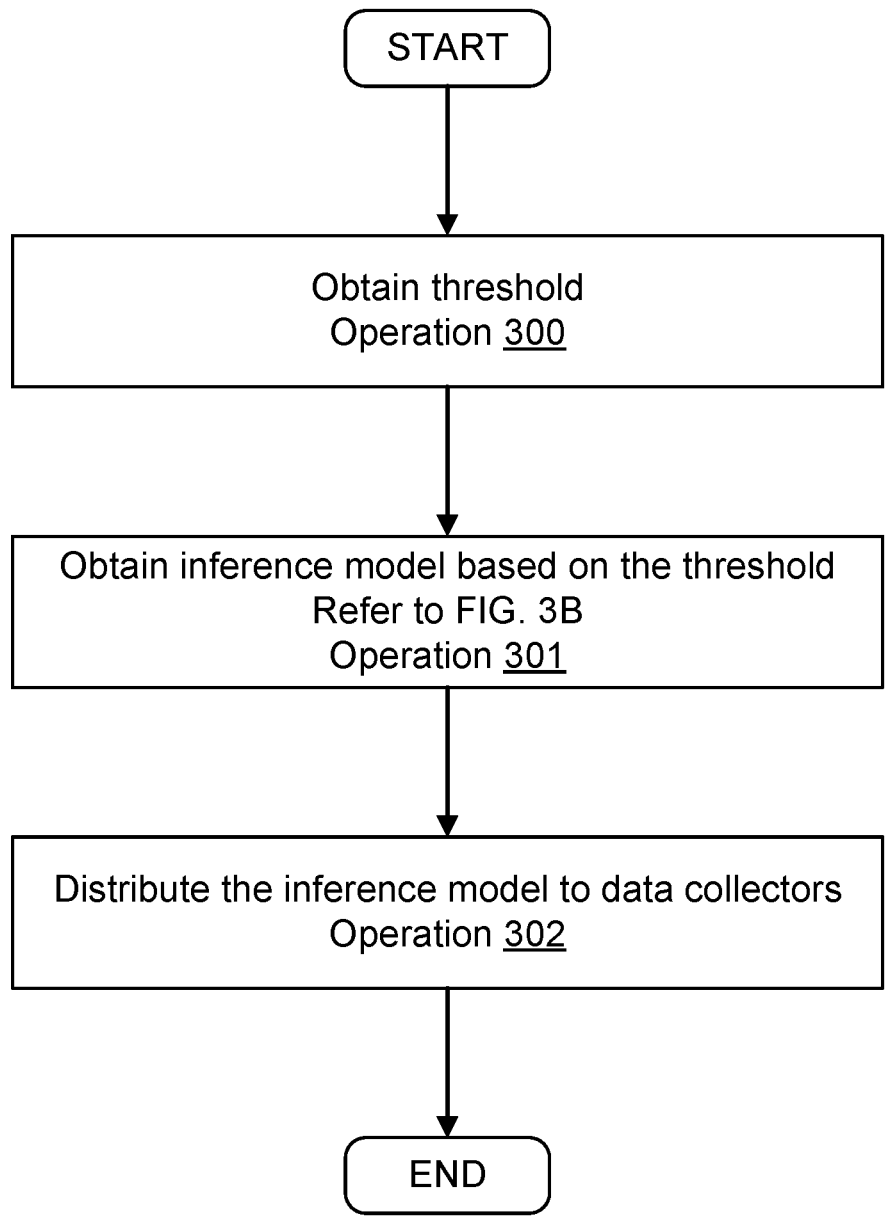
FIG. 3A shows a flow diagram illustrating a method of obtaining and distributing inference models in accordance with an embodiment.

In an embodiment, inference model manager 200 may obtain a threshold, the threshold indicating a maximum acceptable difference between data expected to be collected by the data collector during a future period of time and inferences for the data that will be obtained by the data collector and the data aggregator during the future period of time. The difference may be any type of difference (e.g., a subtraction, absolute value difference, square difference, inner product, and/or any linear or non-linear measure, etc.) and may be determined via any method. The threshold may be any static or dynamic threshold, may be set by a user, and/or may be obtained from another entity through a communication system (e.g., communication system 101). Refer to FIG. 3A for additional details regarding thresholds.

In an embodiment, inference model manager 200 may obtain an inference model based on the threshold. Inference model manager 200 may obtain a trained inference model from an inference model repository (e.g., inference model repository 204). Inference models may be selected from the inference model repository 204 via an inference model lookup table (e.g., inference model lookup table 207). In order to perform a lookup using the inference model lookup table 207, inference model manager 200 may input a threshold into the inference model lookup table 207 to generate a result. The result may include a list of inference models that meet the threshold, the list of inference models being a subset of the inference models in inference model repository 204. Inference model manager 200 may select the least computationally-costly inference model from the list of inference models.

Figure 3B:
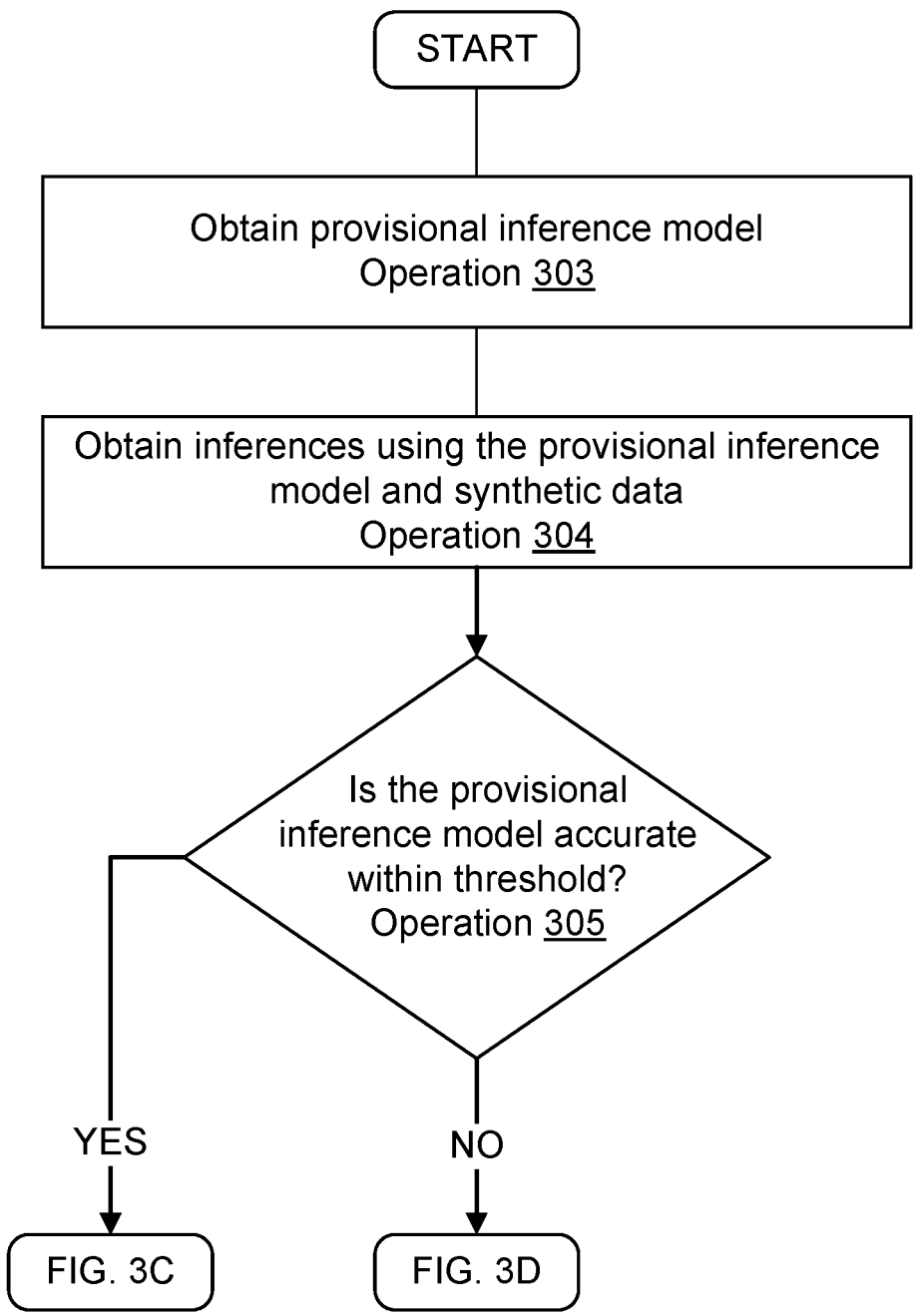
FIG. 3B shows a flow diagram illustrating a method of simulating operation of an inference model in accordance with an embodiment.
Figure 3C:
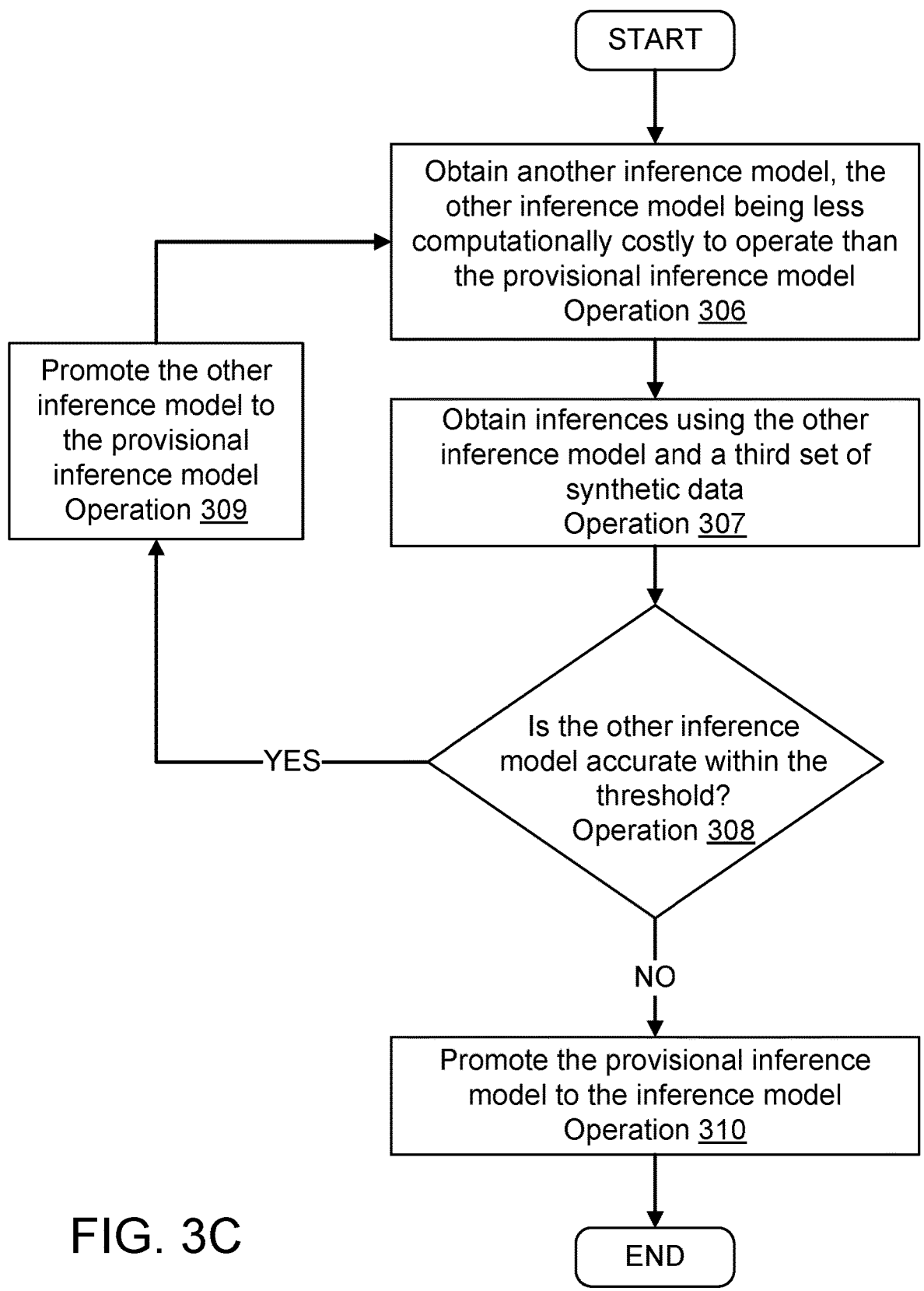
FIG. 3C shows a flow diagram illustrating a method of obtaining less computationally-costly inference models in accordance with an embodiment.
Figure 3D:
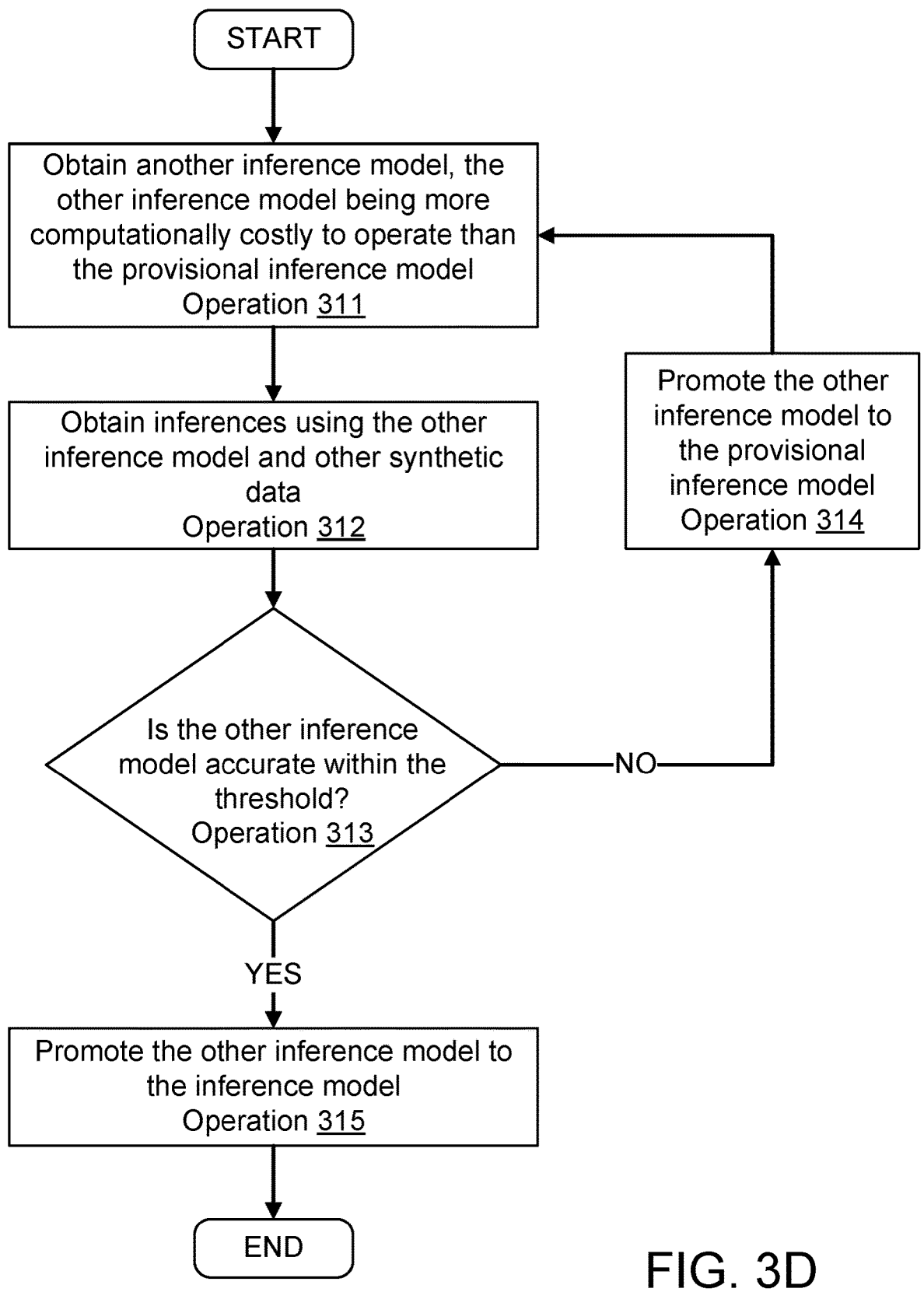
FIG. 3D shows a flow diagram illustrating a method of obtaining more computationally-costly inference models in accordance with an embodiment.

In an embodiment, inference model manager 200 may train a series of inference models in order to obtain an inference model based on the threshold. In order to do so, inference model manager 200 may obtain training data from training data repository 205 and may feed the training data into a machine learning model to obtain a trained provisional inference model. Inference model manager 200 may subsequently simulate operation of the provisional inference model to determine whether the provisional inference model may generate inferences that meet the threshold. In the event that the provisional inference model does meet the threshold, inference model manager may determine whether another inference model may meet the threshold while consuming fewer computing resources. Refer to FIG. 3C for additional details regarding this step. In the event that the provisional inference model does not meet the threshold, inference model manager 200 may determine whether another inference model may meet the threshold while consuming additional computing resources. Refer to FIG. 3D for additional details regarding this step. Any inference model (e.g., provisional inference model or another inference model) that meets the threshold while consuming the least amount of computing resources may be promoted to the inference model.

In an embodiment, inference model manager 200 may distribute the inference model to data collectors 100 throughout the distributed environment. Inference model manager 200 may distribute a copy of the inference model to data collectors 100 and maintain a second copy of the inference model in storage. By doing so, both data collectors 100 and data aggregator 102 may have access to identical inferences without needing to distribute inferences via communication system 101. Data collectors 100 may use the inference model to obtain reduced-size representations of data based on measurements performed by the data collectors 100. By doing so, a reduced quantity of data may be transmitted via communication system 101 and computing resources may be conserved by data collectors 100 and/or data aggregator 102.

Data consumers 201 may consume data from the data aggregator 102 to provide computer-implemented services to users of data aggregator 102 and/or other computing devices operably connected to data aggregator 102. The computer-implemented services may include any type and quantity of services which may utilize, at least in part, data aggregated from a variety of sources (e.g., data collectors 100) within a distributed environment. While shown in FIG.

2 as being part of data aggregator 102, a separate entity may host data consumers 201 throughout the distributed system.

For example, data consumers 201 may use the aggregated data to modify industrial manufacturing processes, to sound alerts for undesired operation of systems, identify locations of persons in an environment, and/or for any other type of purpose. Consequently, data consumers 201 may perform various actions (e.g., action sets) based on the data aggregated by data aggregator 102.

In an embodiment, one or more of inference model manager 200 and data consumers 201 is implemented using a hardware device including circuitry. The hardware device may be, for example, a digital signal processor, a field programmable gate array, or an application specific integrated circuit. The circuitry may be adapted to cause the hardware device to perform the functionality of inference model manager 200 and/or data consumers 201. One or more of inference model manager 200 and data consumers 201 may be implemented using other types of hardware devices without departing from embodiments disclosed herein.

In an embodiment, one or more of inference model manager 200 and data consumers 201 is implemented using a processor adapted to execute computing code stored on a persistent storage that when executed by the processor performs the functionality of inference model manager 200 and/or data consumers 201 discussed throughout this application. The processor may be a hardware processor including circuitry such as, for example, a central processing unit or a microcontroller. The processor may be other types of hardware devices for processing digital information without departing from embodiments disclosed herein.

When providing its functionality, inference model manager 200 and/or data consumers 201 may perform all, or a portion, of the operations and/or actions discussed with respect to FIGS. 3A-3D.

When providing its functionality, inference model manager 200 and/or data consumers 201 may store data and use data stored in storage 202.

In an embodiment, storage 202 is implemented using physical devices that provide data storage services (e.g., storing data and providing copies of previously stored data). The devices that provide data storage services may include hardware devices and/or logical devices. For example, storage 202 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 202 may include a memory device (e.g., a dual in line memory device) in which data is stored and from which copies of previously stored data are provided. In another example, storage 202 may include a persistent storage device (e.g., a solid-state disk drive) in which data is stored and from which copies of previously stored data is provided. In a still further example, storage 202 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 202 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 202 may store data structures including, for example, threshold repository 203, inference model repository 204, training data repository 205, inference repository 206, inference model lookup table 207, and synthetic data repository 208. Any of these data structures may be usable by components of the system in FIG. 1. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein. Each of these data structures is discussed below.

In an embodiment, threshold repository 203 may include any number of thresholds obtained by data aggregator 102. Thresholds may indicate a maximum acceptable difference between data expected to be collected by the data collector during a future period of time and inferences for the data that will be obtained by the data collector and the data aggregator during the future period of time. The thresholds may be static or dynamic thresholds, may be set by a user, and/or may be obtained from another entity through a communication system (e.g., communication system 101).

In an embodiment, inference model repository 204 may include any number of inference models. The inference models may be obtained by feeding training data (e.g., from training data repository 205) into a machine learning (e.g. a deep learning) model to predict data based on measurements performed by data collectors 100 (and/or other sources) without having access to the measurements. Inference model repository 204 may include copies of one or more twin inference models. One copy of each twin inference model may be hosted by data aggregator 102, while another identical copy of each twin inference model may be hosted by one or more sources (e.g., data collectors 100) throughout a distributed environment. Consequently, data aggregator 102 and each source (e.g., data collector) throughout the distributed environment may have access to identical inferences generated by copies of the twin inference models.

In an embodiment, training data repository 205 may include training data usable to train a machine learning model (and/or other types of inference-generation models). Training data may be obtained from various sources throughout a distributed environment (e.g., from data collectors 100) and may include (all of, or a portion thereof) a series of measurements representing an ambient environment (e.g., a characteristic thereof) and/or other types of measurements.

For example, training data repository 205 may include a set of temperature measurements taken at different times in an industrial environment by one or more temperature sensors. Temperature sensors may collect a set of temperature measurements at different times over any period of time. For example, one temperature sensor may record the following data over the course of one hour: $T_1=36.5°$ C., $T_2=35.0°$ C., $T_3=35.5°$ C., $T_4=35.0°$ C., $T_5=36.0°$ C. These temperature measurements may be temporarily or permanently stored by the temperature sensor and transmitted to a central temperature control system when requested for purposes of training a machine-learning model to predict future temperature measurements in the same environment (and/or other purposes).

In an embodiment, inference repository 206 may include any number of inferences obtained by inference model manager 200. The inferences may be generated by a copy of a twin inference model from inference model repository 204. The twin inference model may be obtained by feeding training data (e.g., from training data repository 205) into a machine learning (e.g., deep learning) model. In an embodiment, a deep learning-based model is used to predict future measurements collected by data collectors 100 without having access to the series of measurements. Data aggregator 102 and data collectors 100 may host identical copies of a twin inference model and, therefore, may have access to identical inferences. The inferences may be, for example, predictions of temperature readings collected by a temperature sensor at various times. The inferences may be other types of predictions without departing from embodiments disclosed herein.

In an embodiment, inference model lookup table 207 may include entries, each entry including an identifier for one of the inference models (e.g., from inference model repository 204) referenced in the lookup table. Each entry in inference model lookup table 207 may be keyed to a corresponding threshold (e.g., from threshold repository 203) such that a lookup performed with a given threshold returns all entries keyed to that given threshold.

In an embodiment, synthetic data repository 208 may include synthetic data usable to simulate operation of a machine learning model (and/or other types of inference-generation models). Synthetic data may be obtained by data aggregator 102 by generating the synthetic data and/or from various sources throughout a distributed environment (e.g., from data collectors 100). Synthetic data may be intended to imitate a series of measurements representing an ambient environment (e.g., a characteristic thereof) and/or other types of measurements.

For example, synthetic data repository 208 may include a simulated set of temperature measurements. For example, a simulated set of temperature measurements may include the following synthetic data: $T_1=35.5°$ C., $T_2=36.0°$ C., $T_3=36.5°$ C., $T_4=34.0°$ C., $T_5=34.0°$ C. These synthetic temperature measurements may be temporarily or permanently stored by the data aggregator 102 for purposes of simulating the operation of a machine-learning model to predict future temperature measurements in an industrial environment (and/or other purposes).

While illustrated in FIG. 2 as including a limited number of specific components, a data aggregator in accordance with an embodiment may include fewer, additional, and/or different components than shown in FIG. 2.

As discussed above, the components of FIG. 1 may perform various methods to manage inference model distribution throughout a distributed environment. FIGS. 3A-3D illustrate methods that may be performed by the components of FIG. 1. In the diagrams discussed below and shown in FIGS. 3A-3D, any of the operations may be repeated, performed in different orders, and/or performed in parallel with or in a partially overlapping in time manner with other operations.

Turning to FIG. 3A, a flow diagram illustrating a method of obtaining and distributing inference models in accordance with an embodiment is shown.

At operation 300, a threshold may be obtained by the data aggregator 102. Data aggregator 102 may obtain the threshold from one or more sources (e.g., data collectors, other devices not shown, data consumers, etc.) throughout a distributed environment. The threshold may indicate a maximum acceptable difference between data expected to be collected by the data collectors during future measurements and inferences generated by the inference model, the inferences being intended to match data expected to be collected by the data collectors during future measurements.

In an embodiment, the threshold may be obtained from any number of data collectors (e.g., data collectors 100) throughout a distributed environment. For example, requests for thresholds may be sent to data collectors 100 and data collectors 100 may provide the thresholds in response to the requests. Such requests and/or thresholds may be passed via a communication system operably connecting the data aggregator and the data collectors 100.

In an embodiment, thresholds may be provided by another entity through a communication system. For example, the thresholds may be obtained by another entity (e.g., any number of downstream consumers intending to use data from data aggregator 102 to monitor industrial processes). In addition, the thresholds may be obtained by an entity (e.g., a second data aggregator) throughout a second distributed environment with a similar environment. The thresholds may be provided to any number of data aggregators in any number of distributed environments.

At operation 301, an inference model may be obtained based on the threshold. The inference model may be a machine learning model (or any other type of inference-generation model) and may be trained to generate inferences intended to match data based on measurements performed by data collectors 100 without having access to data obtained by the data collectors. The maximum acceptable difference between data obtained by data collectors 100 and the inferences generated by the inference model may be represented by the threshold. For example, a threshold for temperature measurements may be $±0.5°$ C. An inference model may meet the threshold by generating inferences for temperature measurements within $±0.5°$ C. of temperature measurements collected by a temperature sensor (e.g., a data collector).

In an embodiment, an inference model may be obtained by performing a lookup in an inference model lookup table. The inference model lookup table may include entries, each of the entries including an identifier for one of the inference models referenced in the lookup table. Each entry in the inference model lookup table may be keyed to a corresponding threshold such that a lookup performed with a given threshold returns all entries keyed (e.g., all inference models that at least meet the thresholds) to that given threshold. The inference models obtained from the inference model lookup table (or obtained from a repository using identifiers obtained from the lookup table) may or may not require training by the data aggregator (e.g., may be trained elsewhere).

In an embodiment, the inference model may be obtained by the data aggregator using a training data set. The training data set may be fed into a machine learning model (and/or other type of inference generation model) to obtain the inference model to predict future measurements from data collectors. Refer to FIGS. 3B-3D for additional details regarding training inference models.

In an embodiment, the inference model may be obtained from another entity through a communication system (e.g., communication system 101). For example, an inference model may be obtained by another entity through training a machine learning model and providing the trained machine learning model to the data aggregator. In this scenario, the inference model obtained via another entity may or may not require training by the data aggregator.

In an embodiment, the inference model is obtained via the method illustrated in FIG. 3B. The inference model may be obtained via other methods without departing from embodiments disclosed herein.

At operation 302, the inference model may be distributed to data collectors throughout the distributed environment. The inference models may be twin inference models. Each copy of a twin inference model may generate identical inferences. Therefore, throughout the distributed environment, data aggregator 102 and each data collector hosting a copy of the twin inference model may obtain identical inferences throughout the process of data collection (and/or other processes).

In an embodiment, the copy of a trained twin inference model may be distributed by data aggregator 102 to data collectors 100 throughout the distributed environment via a communication system (e.g., communication system 101). For example, a copy of the trained twin inference model may be distributed to various data collectors by data aggregator 102 as part of the process of setting up a new distributed environment for data collector (and/or other purposes). In addition, a copy of the trained twin inference model may be distributed to various data collectors by data aggregator 102 as part of the process of adding or replacing one or more data collectors in a distributed environment.

Inference models may be trained by data aggregator 102 to generate inferences intended to match data obtained by data collectors within a threshold for inference accuracy. However, data collectors may have limited computational resources available to host and operate inference models. Therefore, an inference model may be chosen based on the amount of computing resources consumed during operation (assuming the inferences generated by the inference model meet the threshold for inference accuracy). In order to determine whether an inference model meets the threshold for inference accuracy, data aggregator 102 may simulate operation of the inference model as described with respect to FIG. 3B.

The method may end following operation 302.

Turning to FIG. 3B, a flow diagram illustrating a method of simulating operation of an inference model in accordance with an embodiment is shown. The operations in FIG. 3B may be an expansion of operation 301 in FIG. 3A.

At operation 303, a provisional inference model may be obtained by data aggregator 102. Data aggregator 102 may classify inference models as provisional inference models prior to simulating the operation and evaluating the accuracy of inferences generated by the inference model. Data aggregator 102 may promote a provisional inference model to the inference model upon determining that the provisional inference model consumes the minimum quantity of computing resources while meeting a threshold for inference accuracy In an embodiment, a provisional inference model may be obtained by the data aggregator using a training data set. The training data set may be fed into a machine learning model (and/or other type of inference generation model) to obtain the provisional inference model to predict future measurements from data collectors.

In an embodiment, the provisional inference model may be obtained from another entity through a communication system (e.g., communication system 101). For example, a provisional inference model may be obtained by another entity through training a machine learning model and providing the trained machine learning model to the data aggregator. In this scenario, the provisional inference model obtained via another entity may or may not require training by the data aggregator.

At operation 304, data aggregator 102 may obtain inferences using the provisional inference model and synthetic data. Synthetic data may be data simulated by data aggregator 102 in order to imitate data that may be obtained by a data collector. Synthetic data may be simulated based on a particular type of data (and data range) and a particular ambient environment in order to match the ambient environment in which the data collector may operate. The provisional inference model may utilize the synthetic data as input data in order to obtain inferences, the inferences being intended to match a second set of synthetic data. The second set of synthetic data may be generated in order to replicate future measurements performed by the data collector. The inferences may be generated by the provisional inference model without the provisional inference model having access to the second set of synthetic data.

In an embodiment, the inferences may be generated by the provisional inference model hosted by the data aggregator 102. In a second scenario, the inferences may be generated by a copy of the provisional inference model hosted by another entity (e.g., a second data aggregator) and transmitted to data aggregator 102 via a communication system (e.g., communication system 101).

At operation 305, data aggregator 102 may determine whether the provisional inference model is accurate within the threshold. The provisional inference model may be determined accurate within the threshold if the inferences generated by the provisional inference model match the second set of synthetic data within the acceptable inference accuracy range indicated by the threshold.

Continuing with the above example, the threshold for a series of temperature measurements may be ±0.5° C. Data aggregator 102 may determine that the average of the inferences over a period of time (e.g., a minute, an hour etc.) may match the average of the second set of synthetic data within ±0.5° C. in order to be determined accurate. The average temperature measurement of a second set of synthetic data may be 35.0° C. The average of a set of inferences (inferences intended to match the second set of synthetic data over the same period of time) may be 35.2° C. Therefore, the average of the set of inferences may be determined to match the average temperature measurement of the second set of synthetic data within the threshold of ±0.5° C. In this example, the provisional inference model may be determined accurate.

While described above with respect to a deviation from an average, thresholds may be based on other types of deviations (e.g., maximum, minimum, median, standard deviation, percentiles, etc.). Thresholds may be determined based on individual measurements and/or based on aggregated statistics over time. Thresholds may be other types of thresholds and/or determined via other methods without departing from embodiments disclosed herein.

If the provisional inference model is determined accurate within the threshold, the method may proceed to FIG. 3C. If the provisional inference model is not determined accurate within the threshold, the method may proceed to FIG. 3D.

Turning to FIG. 3C, a flow diagram illustrating a method of obtaining less computationally-costly inference models in accordance with an embodiment is shown. The operations in FIG. 3C may be a continuation of FIG. 3B. A provisional inference model may be determined accurate within a threshold as described above. However, data aggregator 102 and data collectors 100 may have a limited quantity of computing resources to allocate to hosting and operating an inference model. Therefore, an inference model consuming the minimum quantity of computing resources while meeting the threshold may be obtained as described below.

While described below with respect to accuracy vs. computational complexity of inference models, other factors that may impact accuracy of aggregated data may also be taken into account. For example, a level of quantization in the representation of collected data may also be taken into account. Similarly, as will be discussed below, a level of quantization of the representation of the collected data may be increased or decreased to ensure that the aggregated data includes an acceptable level of error while reducing computational resource expenditures for aggregating data.

At operation 306, another inference model may be obtained, the other inference model being less computationally costly to operate than the provisional inference model. The other inference model may be obtained in order to determine whether the other inference model (e.g., the less computationally-costly inference model) may meet the threshold. If so, the other inference model may be preferred due to the limited quantity of computing resources available to the data aggregator, data collectors 100, and/or other entity throughout the distributed system.

In an embodiment, the other inference model may be obtained by performing a lookup in an inference model lookup table. The inference model lookup table may include entries, each of the entries including an identifier for one of the inference models referenced in the lookup table. Each entry in the inference model lookup table may be keyed to a corresponding threshold such that a lookup performed with a given threshold returns all entries keyed to that given threshold. The other inference models obtained from the inference model lookup table may or may not require training by the data aggregator (e.g., may be trained elsewhere).

In an embodiment, the other inference model may be obtained by the data aggregator using a training data set. The training data set may be fed into a machine learning model (and/or other type of inference generation model) to obtain the other inference model to predict future measurements from data collectors.

In an embodiment, the other inference model may be obtained from another entity through a communication system (e.g., communication system 101). For example, another inference model may be obtained by another entity through training a machine learning model and providing the trained machine learning model to the data aggregator. In this scenario, the other inference model obtained via another entity may or may not require training by the data aggregator.

At operation 307, data aggregator 102 may obtain inferences using the other inference model and a third set of synthetic data. Synthetic data may be data simulated by data aggregator 102 in order to imitate data that may be obtained by a data collector (e.g., data collector 100A). Synthetic data may be simulated based on a particular type of data (and data range) and a particular ambient environment in order to match the ambient environment in which the data collector may operate. The other inference model may utilize the third set of synthetic data as input data in order to obtain inferences, the inferences being intended to match a fourth set of synthetic data. The fourth set of synthetic data may be generated in order to replicate future measurements performed by the data collector 100A. The inferences may be generated by the other inference model without the other inference model having access to the fourth set of synthetic data.

In an embodiment, the inferences may be generated by the other inference model hosted by the data aggregator 102. In a second scenario, the inferences may be generated by a copy of the other inference model hosted by another entity (e.g., a second data aggregator) and transmitted to data aggregator 102 via a communication system (e.g., communication system 101).

At operation 308, data aggregator 102 may determine whether the other inference model is accurate within the threshold. The other inference model may be determined accurate within the threshold if the inferences generated by the other inference model match the fourth set of synthetic data within the acceptable inference accuracy range indicated by the threshold.

If the other inference model is determined accurate within the threshold, the method may proceed to operation 309. If the other inference model is not determined accurate within the threshold, the method may proceed to operation 310.

At operation 309, the other inference model may be promoted to the provisional inference model. If the other inference model is determined accurate within the threshold, a further reduction in computing resources may be possible. Following operation 309, the method may proceed to operation 306. By doing so, additional inference models may be obtained (e.g., inference models that consume fewer computing resources than the other inference model) to attempt to determine the minimum quantity of computing resources consumed by an inference model while meeting the threshold.

At operation 310, the provisional inference model may be promoted to the inference model. The other inference model may not meet the threshold and, therefore, a more computationally-costly inference model may be required in order to meet the threshold. Therefore, the provisional inference model may be determined the inference model that consumes the minimum quantity of computing resources while meeting the threshold. The data aggregator 102 may subsequently distribute the inference model (or copies of the inference model) to data collectors 100 to facilitate data collection throughout the distributed environment as described with respect to FIG. 3A.

The method may end following operation 310.

Returning to FIG. 3B, if the provisional inference model is not determined accurate within the threshold, the method may proceed to FIG. 3D.

Turning to FIG. 3D, a flow diagram illustrating a method of obtaining more computationally-costly inference models in accordance with an embodiment is shown. The operations in FIG. 3D may be a continuation of FIG. 3B. A provisional inference model may be determined inaccurate within a threshold as described with respect to FIG. 3B. In order to obtain an accurate inference model (an inference model capable of generating inferences accurate within the threshold) a more computationally-costly inference model may be obtained as described below.

At operation 311, another inference model may be obtained, the other inference model being more computationally costly to operate than the provisional inference model. The other inference model may be obtained in order to determine whether the other inference model (e.g., a more computationally-costly inference model) may meet the threshold for inference accuracy.

In an embodiment, the other inference model may be obtained by performing a lookup in an inference model lookup table. The inference model lookup table may include entries, each of the entries including an identifier for one of the inference models referenced in the lookup table. Each entry in the inference model lookup table may be keyed to a corresponding threshold such that a lookup performed with a given threshold returns all entries keyed to that given threshold. The other inference models obtained from the inference model lookup table may or may not require training by the data aggregator (e.g., may be trained elsewhere).

In an embodiment, the other inference model may be obtained by the data aggregator using a training data set. The training data set may be fed into a machine learning model (and/or other type of inference generation model) to obtain the other inference model to predict future measurements from data collectors 100.

In an embodiment, the other inference model may be obtained from another entity through a communication system (e.g., communication system 101). For example, another inference model may be obtained by another entity through training a machine learning model and providing the trained machine learning model to the data aggregator. In this scenario, the other inference model obtained via another entity may or may not require training by the data aggregator 102.

At operation 312, data aggregator 102 may obtain inferences using the other inference model and a third set of synthetic data. Synthetic data may be data simulated by data aggregator 102 in order to imitate data that may be obtained by a data collector (e.g., data collector 100A). Synthetic data may be simulated based on a particular type of data (and data range) and a particular ambient environment in order to match the ambient environment in which the data collector 100A may operate. The other inference model may utilize the third set of synthetic data as input data in order to obtain inferences, the inferences being intended to match a fourth set of synthetic data. The fourth set of synthetic data may be generated in order to replicate future measurements performed by the data collector 100A. The inferences may be generated by the other inference model without the other inference model having access to the fourth set of synthetic data.

In an embodiment, the inferences may be generated by the other inference model hosted by the data aggregator 102. In a second scenario, the inferences may be generated by a copy of the other inference model hosted by another entity (e.g., a second data aggregator) and transmitted to data aggregator 102 via a communication system (e.g., communication system 101).

At operation 313, data aggregator 102 may determine whether the other inference model is accurate within the threshold. The threshold may be obtained from a user, from another entity through a communication system, or via other methods. The other inference model may be determined accurate within the threshold if the inferences generated by the other inference model match the fourth set of synthetic data within the acceptable inference accuracy range indicated by the threshold.

If the other inference model is determined accurate within the threshold, the method may proceed to operation 315. If the other inference model is not determined accurate within the threshold, the method may proceed to operation 314.

At operation 314, the other inference model may be promoted to the provisional inference model. If the other inference model is not determined accurate within the threshold, a further increase in computing resources may be necessary in order to obtain an accurate inference model.

Following operation 314, the method may proceed to operation 311. By doing so, additional inference models may be obtained (e.g., inference models that consume more computing resources than the other inference model) to attempt to determine the minimum quantity of computing resources consumed by an inference model while meeting the threshold.

At operation 315, the other inference model may be promoted to the inference model. The provisional inference model may not meet the threshold and, therefore, a more computationally-costly inference model may be required in order to meet the threshold. Therefore, the other inference model may be determined the inference model that consumes the minimum quantity of computing resources while meeting the threshold for inference accuracy. The data aggregator 102 may subsequently distribute the inference model (or copies of the inference model) to data collectors 100 to facilitate data collection throughout the distributed environment as described with respect to FIG. 3A.

The method may end following operation 315.

Figure 4A:
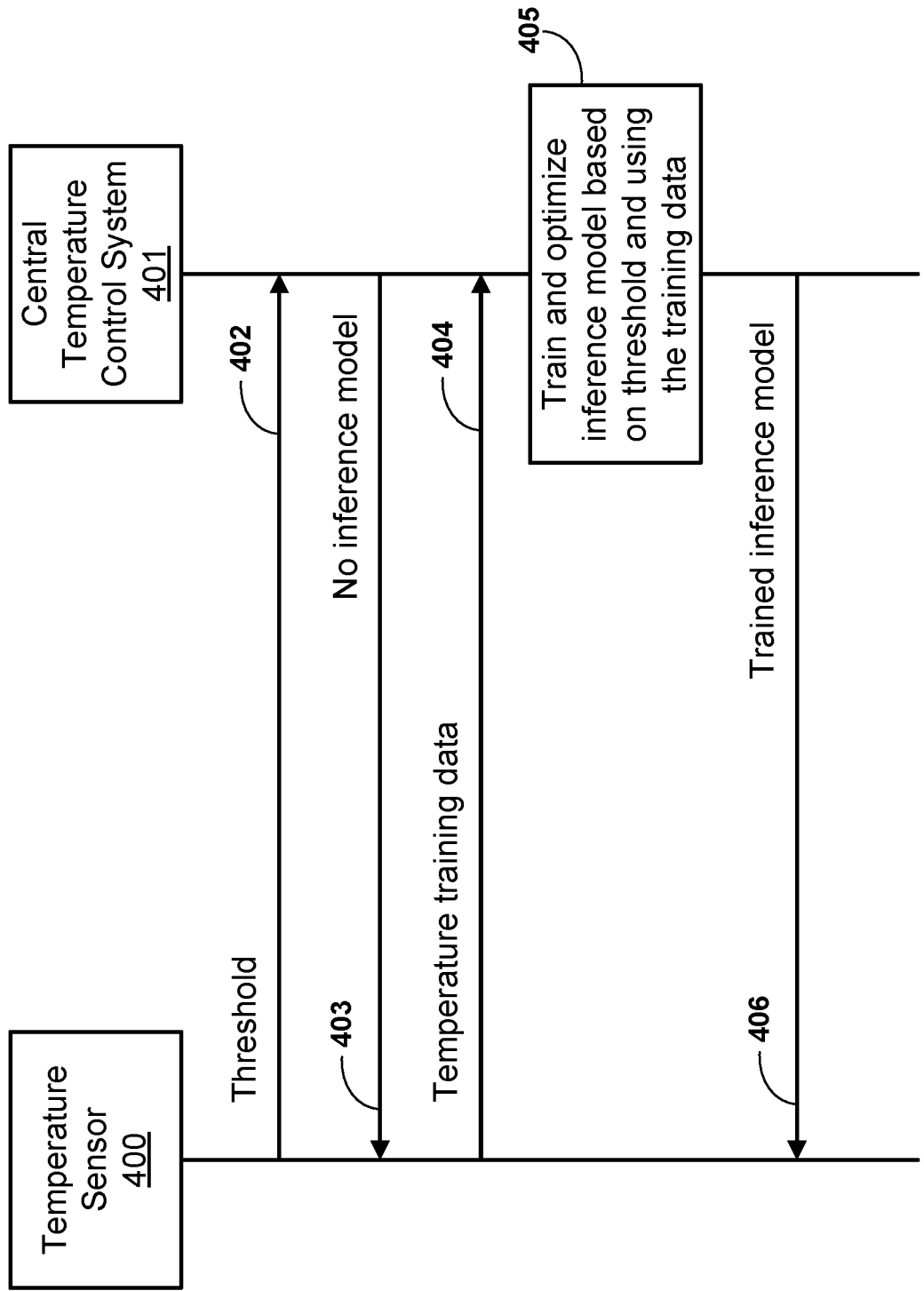
FIGS. 4A-4C show block diagrams illustrating a system in accordance with an embodiment over time.
Figure 4B:
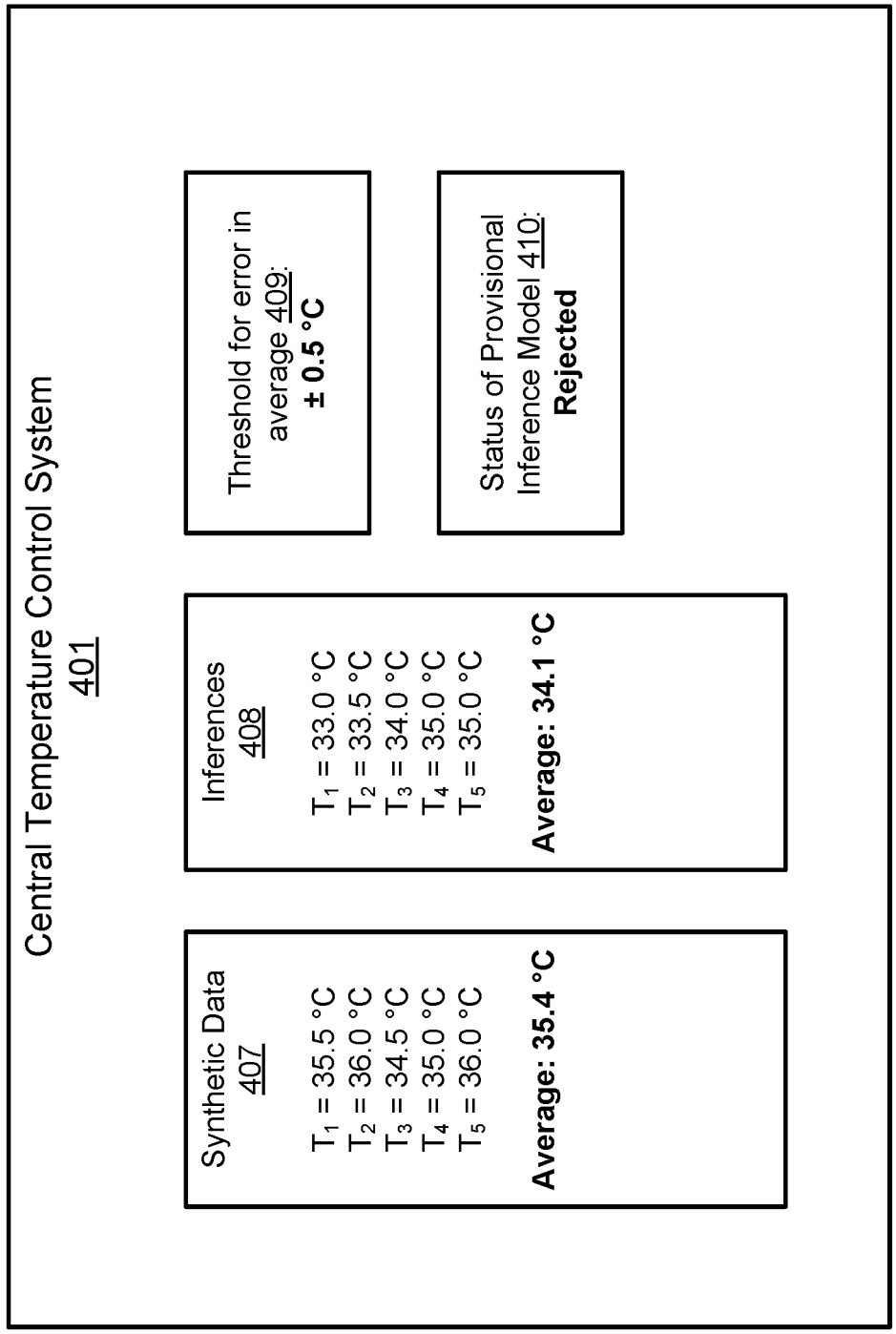
Figure 4C:
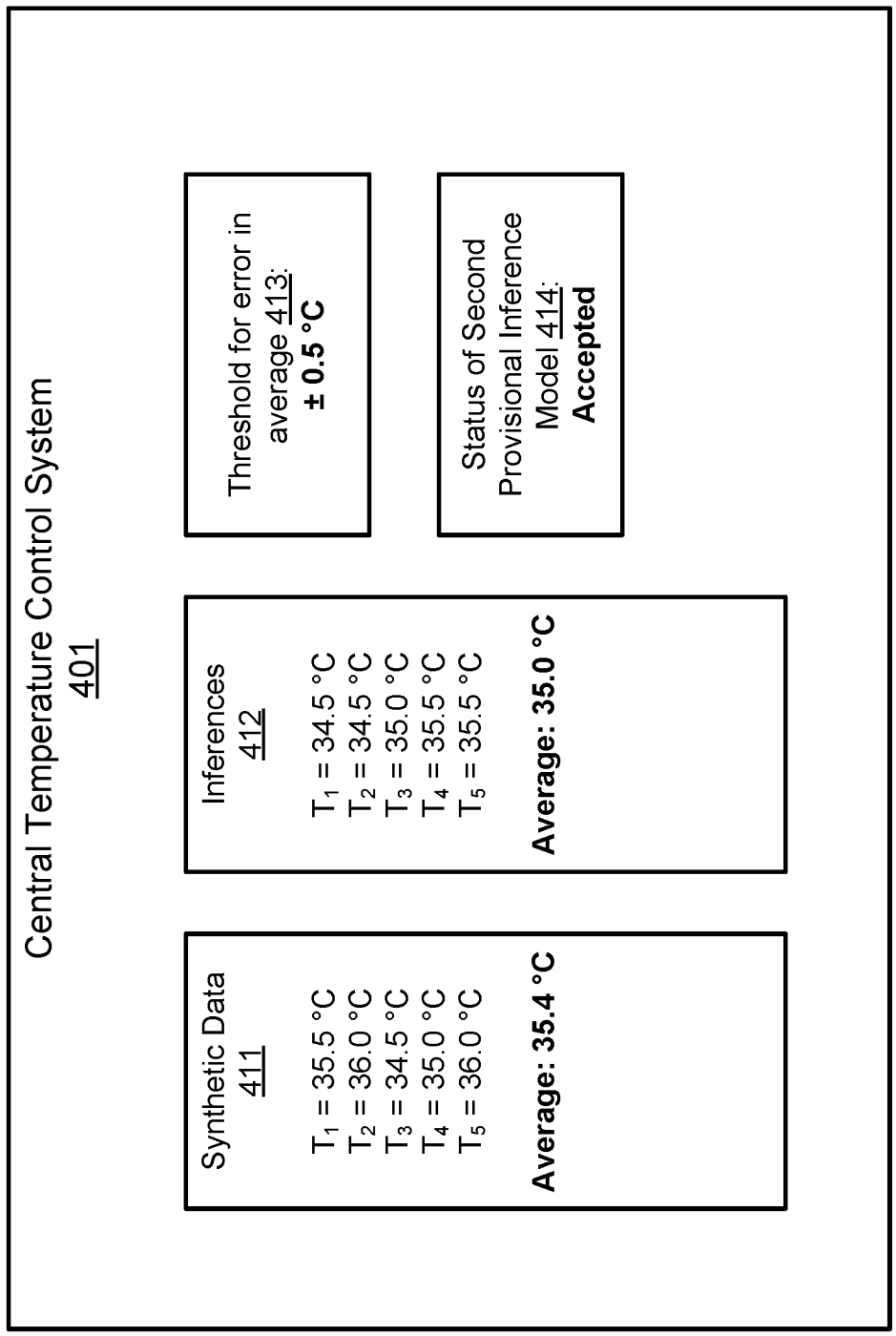

Turning to FIGS. 4A-4C, these figures may illustrate a system similar to that of FIG. 1 in accordance with an embodiment. FIGS. 4A-4C may show actions performed by the system over time. The system may include temperature sensor 400 and central temperature control system 401. In FIG. 4A, operations performed by a temperature sensor are shown along the line extending from the box labeled "temperature sensor 400." Similarly, operations performed by a central temperature control system are shown along the line extending from the box labeled "central temperature control system 401." Operations impacting two or more devices, such as data transmissions between the devices, are shown using arrows extending between the lines. Generally, the operations are ordered temporally with respect to one another. However, it will be appreciated that the operations may be performed in other orders from those illustrated herein.

Turning to FIG. 4A, consider a scenario where temperature sensor 400 (e.g., part of a data collector) may collect temperature measurements, the temperature measurements indicating the ambient environment in which the temperature sensor 400 operates. Temperature sensor 400 and central temperature control system 401 (e.g., a data aggregator) may host identical copies of a twin inference model. The copies of the twin inference model may generate identical inferences intended to match data based on measurements performed by temperature sensor 400. Temperature sensor 400 may transmit temperature data to the central temperature control system 401 once per hour. However, in order to minimize the amount of data transmitted and, therefore, conserve network bandwidth, temperature sensor 400 may transmit a reduced-size representation of data rather than the data. For additional details regarding methods of reduced-size data transmission, refer to FIG. 1.

Temperature sensor 400 may transmit a reduced-size representation of data only if the inferences generated by the copy of the twin inference model hosted by the temperature sensor 400 match the data obtained by the temperature sensor 400 within a threshold. For example, the threshold may be ±0.5° C. If the inferences do not match the data within the threshold, temperature sensor 400 may send the data to central temperature control system 401. In order to minimize the amount of data transmitted to central temperature control system 401, temperature sensor 400 may request an inference model capable of generating inferences within the threshold as described below.

At operation 402, temperature sensor 400 may transmit a threshold to central temperature control system 401. As described above, the threshold may be ±0.5° C. Refer to FIG. 4B for additional details regarding thresholds.

Following receipt of the threshold from temperature sensor 400, central temperature control system 401 may perform a lookup in an inference model lookup table. The inference model lookup table may include entries, each of the entries including an identifier for one of the inference models referenced in the lookup table. Each entry may be keyed to a corresponding threshold such that a lookup performed with the given threshold may return all entries keyed to that given threshold. In this example, the central temperature control system 401 may not locate any inference models that meet the threshold in the inference model lookup table.

At operation 403, central temperature control system 401 may transmit a message to temperature sensor 400 indicating that no inference model exists that meets the threshold. In addition, this message may initiate a process of training a new inference model to generate inferences intended to match data based on measurements performed by temperature sensor 400 within the threshold. In order to do so, central temperature control system 401 may request a set of training data from temperature sensor 400.

At operation 404, temperature sensor 400 may transmit a set of training data to central temperature control system 401. The training data may be collected at various time intervals (e.g., $T_1$, $T_2$, etc.) over the course of one hour and may include the following: $T_1=36.5°$ C., $T_2=35.5°$ C., $T_3=35.0°$ C., $T_4=35.5°$ C., $T_5=34.5°$ C. The training data may be used to train a twin inference model to facilitate reduced-size data transmission between temperature sensor 400 and central temperature control system 401.

At operation 405, central temperature control system 401 may train and optimize an inference model based on the threshold and using the training data. The central temperature control system 401 may train a provisional inference model using the training data. The central temperature control system 401 may then simulate operation of the provisional inference model to determine whether the provisional inference model may generate inferences within the threshold of ±0.5° C.

The central temperature control system 401 may utilize a set of synthetic temperature data as input data for the provisional inference model. The provisional inference model may generate a set of temperature inferences based on the input data. Central temperature control system 401 may compare the inferences to the synthetic data to determine whether the provisional inference model is accurate within the threshold.

If the provisional inference model is not determined accurate within the threshold, the central temperature control system 401 may train a second provisional inference model (a more computationally-costly inference model) and simulate the operation of the second provisional inference model to determine if the second provisional inference model is accurate within the threshold. Refer to FIG. 4D for additional details regarding this process.

If the inference model is determined accurate within the threshold, the central temperature control system 401 may train a second provisional inference model (a less computationally-costly inference model) and simulate the operation of the second provisional inference model to determine if the second provisional inference model is accurate within the threshold. By doing so, the central temperature control system 401 may determine whether the provisional inference model consumes excess computing resources during operation. Refer to FIG. 3C for additional details regarding this process.

At operation 406, central temperature control system 401 may distribute a copy of the trained inference model to temperature sensor 400. The trained inference model may be any provisional inference model determined to consume the minimum quantity of computing resources while still meeting the threshold for inference accuracy. The temperature sensor 400 may utilize this trained inference model to facilitate reduced-size data transmissions during data collection.

Turning to FIG. 4B, a provisional inference model optimization process by the central temperature control system 401 is shown. As described above, central temperature control system 401 may optimize a provisional inference model by simulating the operation of the provisional inference model. In order to do so, the provisional inference model may generate a set of inferences 408 including the following: $T_1=33.0°$ C., $T_2=33.5°$ C., $T_3=34.0°$ C., $T_4=35.0°$ C., $T_5=35.0°$ C. The average of the inference may be 34.1° C. The central temperature control system 401 may compare this average of the inferences to an average of a set of synthetic data 407 intended to imitate data based on measurements performed by temperature sensor 400. The synthetic data 407 may include the following: $T_1=35.5°$ C., $T_2=36.0°$ C., $T_3=34.5°$ C., $T_4=35.0°$ C., $T_5=36.0°$ C. The average of the synthetic data 407 may be 35.4° C.

The threshold for error in the average 409 may be ±0.5° C. Therefore, the average of the inferences 408 (34.1° C.) may not match the average of the synthetic data 407 (35.4° C.) within the threshold for error in the average 409 of ±0.5° C. Consequently, the status of the provisional inference model 410 may be rejected.

As the inference model was rejected, a second inference model may be trained and optimized by the central temperature control system 401, the second inference model being more computationally costly than the inference model.

Turning to FIG. 4C, a second provisional inference model optimization by central temperature control system 401 is shown. As described above, central temperature control system 401 may optimize the second provisional inference model by simulating the operation of the second provisional inference model. In order to do so, the second provisional inference model may generate a set of inferences 412 including the following: $T_1=34.5°$ C., $T_2=34.5°$ C., $T_3=35.0°$ C., $T_4=35.5°$ C., $T_5=35.5°$ C. The average of the inferences may be 35.0° C. The central temperature control system 401 may compare this average of the inferences to an average of a set of synthetic data intended to imitate data based on measurements performed by temperature sensor 400. The synthetic data 411 may include the following: $T_1=35.5°$ C., $T_2=36.0°$ C., $T_3=34.5°$ C., $T_4=35.0°$ C., $T_5=36.0°$ C. The average of the synthetic data 411 may be 35.4° C.

The threshold for error in the average 413 may be ±0.5° C. Therefore, the average of the inferences 412 (35.0° C.) may match the average of the synthetic data 411 (35.4° C.) within the threshold for error in the average 413 of ±0.5° C. Consequently, the status of the second provisional inference model 414 may be accepted.

The central temperature control system 401 may promote the second provisional inference model to the inference model. The central temperature control system 401 may distribute a copy of the inference model to the temperature sensor 400 in order to facilitate reduced-size data transmission during data collection. The inference model may consume the minimum quantity of computing resources while meeting the threshold for accuracy of inferences. Therefore, computing resources and network bandwidth may be conserved throughout the system during data collection.

Figure 5:
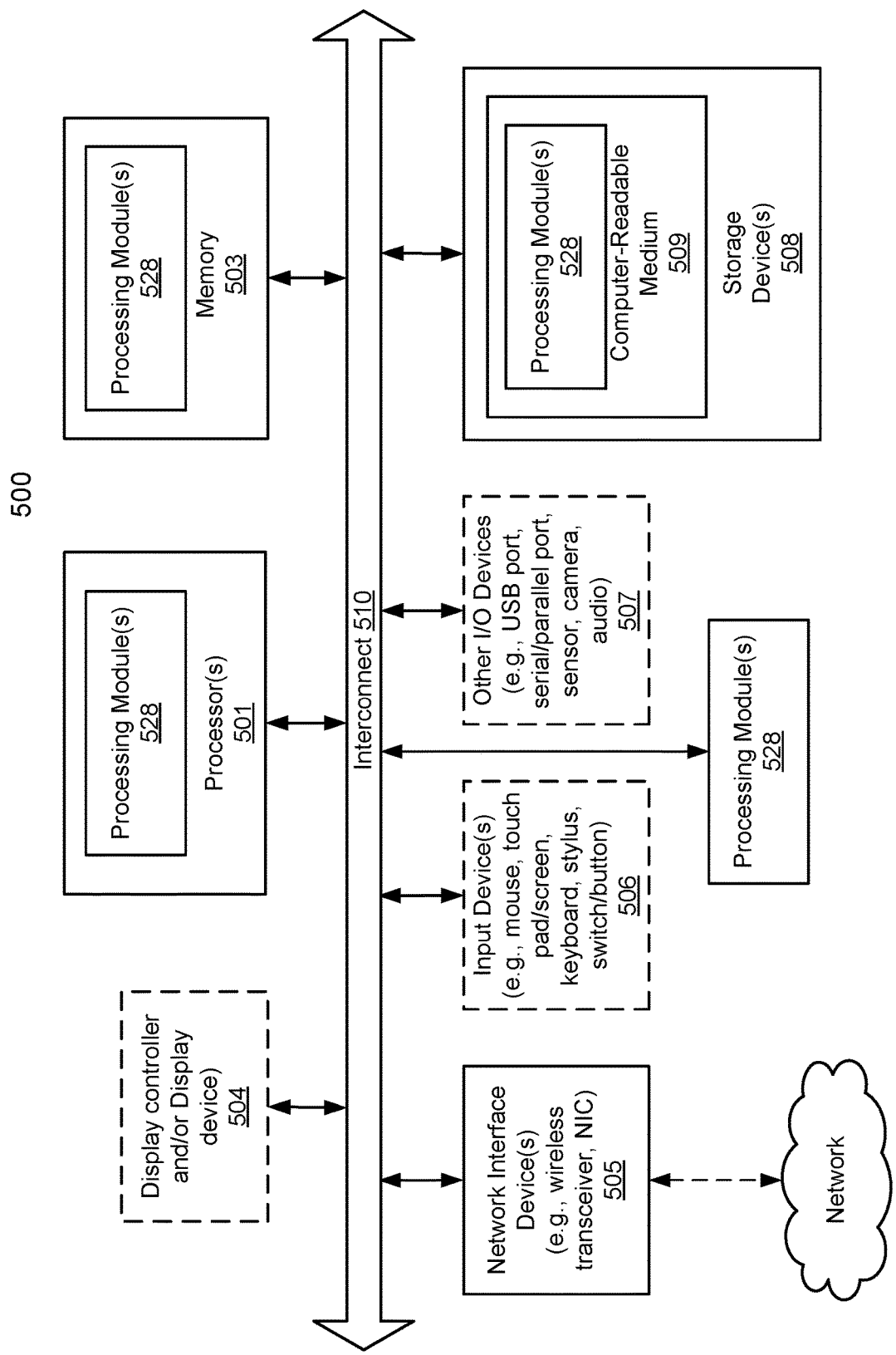
FIG. 5 shows a block diagram illustrating a data processing system in accordance with an embodiment.

Any of the components illustrated in FIGS. 1-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft °, Mac OS/iOS from Apple, Android® from Google °, Linux °, Unix °, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing inference model distribution in a distributed environment where data is collected in a data aggregator of the distributed environment and from at least a data collector operably connected to the data aggregator via a communication system, the method comprising:

obtaining, by the data aggregator, a threshold, the threshold indicating a maximum acceptable difference between:

data expected to be collected by the data collector during a future period of time, and future data predicted to be collected by the data collector and the data aggregator during the future period of time;

obtaining, by the data aggregator, an inference model based on the threshold, the inference model being adapted to generate a prediction comprising the future data and is obtained by:
   performing a lookup in an inference model lookup table using the threshold to obtain a result; and
   based on the result:
      obtaining a list of inference models that meet the threshold, the list of inference models being a subset of all inference models referenced in the lookup table; and
      selecting an inference model from the list of inference models, the inference model having a lowest computational cost for operation of the inference models of the list of inference models, where each inference model of the subset of all inference models are adapted to generate the prediction that comprises the future data, and different inference models of the subset of the inference models being adapted to generate the prediction at different degrees of accuracy and consume different quantities of computing resources of the data collector for generation of the prediction; and
distributing, by the data aggregator, the inference model to the data collector to facilitate twin inference generation by the data collector and the data aggregator, the twin inference generation facilitating aggregation of a portion of the data by the data aggregator without transmission of the portion of the data between the data collector and the data aggregator.

2. The method of claim 1, wherein the inference model lookup table comprises entries, each of the entries comprising an identifier for one of the inference models referenced in the lookup table, and each of the entries being keyed to a corresponding threshold such that a lookup performed with a given threshold returns all entries keyed to that given threshold.

3. The method of claim 1, further comprising:
obtaining a second inference model based on the threshold by:
   obtaining a provisional inference model; and
   optimizing the provisional inference model based on the threshold to obtain the second inference model.

4. The method of claim 3, wherein optimizing the provisional inference model based on the threshold comprises:
simulating operation of the provisional inference model to obtain an inference error rate for the provisional inference model;
making a determination regarding whether the inference error rate meets the threshold;
in an instance where the determination indicates that the inference error rate does not meet the threshold:
   discarding the provisional inference model; and
   obtaining a second provisional inference model, the second provisional inference model consuming a larger quantity of computing resources for operation than the provisional inference model; and
in an instance where the determination indicates that the inference error rate does meet the threshold:
   obtaining a second provisional inference model, the second provisional inference model consuming a smaller quantity of computing resources for operation than the provisional inference model.

5. The method of claim 4, further comprising:
in the instance where the determination indicates that the inference error rate does meet the threshold:
   simulating operation of the second provisional inference model to obtain a second inference error rate for the second provisional inference model;
   making a second determination regarding whether the second inference error rate meets the threshold;
   in an instance where the second determination indicates that the second inference error rate does not meet the threshold:
      using the provisional inference model as the second inference model; and
   in an instance where the second determination indicates that the second inference error rate does meet the threshold:
      obtaining a third provisional inference model, the third provisional inference model consuming a smaller quantity of computing resources for operation than the second provisional inference model.

6. The method of claim 4, further comprising:
in the instance where the determination indicates that the inference error rate does not meet the threshold:
   simulating operation of the second provisional inference model to obtain a second inference error rate for the second provisional inference model;
   making a second determination regarding whether the second inference error rate meets the threshold;
   in an instance where the second determination indicates that the second inference error rate does not meet the threshold:
      discarding the second provisional inference model; and
      obtaining a third provisional inference model, the third provisional inference model consuming a larger quantity of computing resources for operation than the second provisional inference model; and
   in an instance where the second determination indicates that the second inference error rate does meet the threshold:
      using the second provisional inference model as the second inference model.

7. The method of claim 1, further comprising:
obtaining, by the data aggregator, the portion of the data using a reduced-size representation of the portion of the data from the data collector without receiving the portion of the data from the data collector.

8. The method of claim 7, wherein obtaining the portion of the data comprises:
obtaining a twin inference; and
reconstructing the portion of the data using the twin inference and the reduced-size representation of the portion of the data, the reduced-size representation of the portion of the data being based on a second twin inference corresponding to the twin inference and generated by the data collector.

9. The method of claim 1, wherein distributing the inference model to the data collector to facilitate the twin inference generation by the data collector and the data aggregator comprises:
generating a twin copy of the inference model obtained by the data aggregator; and
transmitting, by the data aggregator, the twin copy to the data collector such that the data aggregator and the data collector host identical copies of the inference model obtained by the data aggregator, wherein the twin copy hosted on the data collector generates identical inferences as the inference model hosted on the data aggregator.

10. A non-transitory machine-readable medium having instructions stored therein, which when executed by a processor, cause the processor to perform operations for managing inference model distribution in a distributed environment where data is collected in a data aggregator of the distributed environment and from at least a data collector operably connected to the data aggregator via a communication system, the operations comprising:
obtaining, by the data aggregator, a threshold, the threshold indicating a maximum acceptable difference between:
data expected to be collected by the data collector during a future period of time, and
future data predicted to be collected by the data collector and the data aggregator during the future period of time;
obtaining, by the data aggregator, an inference model based on the threshold, the inference model being adapted to generate a prediction comprising the future data and is obtained by:
performing a lookup in an inference model lookup table using the threshold to obtain a result; and
based on the result:
obtaining a list of inference models that meet the threshold, the list of inference models being a subset of all inference models referenced in the lookup table; and
selecting an inference model from the list of inference models, the inference model having a lowest computational cost for operation of the inference models of the list of inference models, where each inference model of the subset of all inference models are adapted to generate the prediction that comprises the future data, and different inference models of the subset of the inference models being adapted to generate the prediction at different degrees of accuracy and consume different quantities of computing resources of the data collector for generation of the prediction; and
distributing, by the data aggregator, the inference model to the data collector to facilitate twin inference generation by the data collector and the data aggregator, the twin inference generation facilitating aggregation of a portion of the data by the data aggregator without transmission of the portion of the data between the data collector and the data aggregator.

11. The non-transitory machine-readable medium of claim 10, wherein the inference model lookup table comprises entries, each of the entries comprising an identifier for one of the inference models referenced in the lookup table, and each of the entries being keyed to a corresponding threshold such that a lookup performed with a given threshold returns all entries keyed to that given threshold.

12. The non-transitory machine-readable medium of claim 10, wherein the operations further comprise:
obtaining a second inference model based on the threshold by:
obtaining a provisional inference model; and
optimizing the provisional inference model based on the threshold to obtain the second inference model.

13. The non-transitory machine-readable medium of claim 12, wherein optimizing the provisional inference model based on the threshold comprises:
simulating operation of the provisional inference model to obtain an inference error rate for the provisional inference model;
making a determination regarding whether the inference error rate meets the threshold;
in an instance where the determination indicates that the inference error rate does not meet the threshold:
discarding the provisional inference model; and
obtaining a second provisional inference model, the second provisional inference model consuming a larger quantity of computing resources for operation than the provisional inference model; and
in an instance where the determination indicates that the inference error rate does meet the threshold:
obtaining a second provisional inference model, the second provisional inference model consuming a smaller quantity of computing resources for operation than the provisional inference model.

14. The non-transitory machine-readable medium of claim 10, wherein the operations further comprise:
obtaining, by the data aggregator, the portion of the data using a reduced-size representation of the portion of the data from the data collector without receiving the portion of the data from the data collector.

15. The non-transitory machine-readable medium of claim 14, wherein obtaining the portion of the data comprises:
obtaining a twin inference; and
reconstructing the portion of the data using the twin inference and the reduced-size representation of the portion of the data, the reduced-size representation of the portion of the data being based on a second twin inference corresponding to the twin inference and generated by the data collector.

16. A data aggregator, comprising:
a processor; and
a memory coupled to the processor to store instructions, which when executed by the processor, cause the processor to perform operations for managing inference model distribution in a distributed environment where data is collected in a data aggregator of the distributed environment and from at least a data collector operably connected to the data aggregator via a communication system, the operations comprising:
obtaining, by the data aggregator, a threshold, the threshold indicating a maximum acceptable difference between:
data expected to be collected by the data collector during a future period of time, and
future data predicted to be collected by the data collector and the data aggregator during the future period of time;
obtaining, by the data aggregator, an inference model based on the threshold, the inference model being adapted to generate a prediction comprising the future data and is obtained by:
performing a lookup in an inference model lookup table using the threshold to obtain a result;
based on the result:
obtaining a list of inference models that meet the threshold, the list of inference models being a subset of all inference models referenced in the lookup table; and
selecting an inference model from the list of inference models, the inference model having a lowest computational cost for operation of the inference models of the list of inference models, where each inference model of the subset of all inference models are adapted to generate the prediction that comprises the future data, and different inference models of the subset of the inference models being adapted to generate the prediction at different degrees of accuracy and consume different quantities of computing resources of the data collector for generation of the prediction; and distributing, by the data aggregator, the inference model to the data collector to facilitate twin inference generation by the data collector and the data aggregator, the twin inference generation facilitating aggregation of a portion of the data by the data aggregator without transmission of the portion of the data between the data collector and the data aggregator.

17. The data aggregator of claim 16, wherein the inference model lookup table comprises entries, each of the entries comprising an identifier for one of the inference models referenced in the lookup table, and each of the entries being keyed to a corresponding threshold such that a lookup performed with a given threshold returns all entries keyed to that given threshold.

18. The data aggregator of claim 16, wherein the operations further comprise:
    obtaining a second inference model based on the threshold by:
      obtaining a provisional inference model; and
      optimizing the provisional inference model based on the threshold to obtain the second inference model.

19. The data aggregator of claim 18, wherein optimizing the provisional inference model based on the threshold comprises:
    simulating operation of the provisional inference model to obtain an inference error rate for the provisional inference model;
    making a determination regarding whether the inference error rate meets the threshold;
    in an instance where the determination indicates that the inference error rate does not meet the threshold:
      discarding the provisional inference model; and
      obtaining a second provisional inference model, the second provisional inference model consuming a larger quantity of computing resources for operation than the provisional inference model; and
    in an instance where the determination indicates that the inference error rate does meet the threshold:
      obtaining a second provisional inference model, the second provisional inference model consuming a smaller quantity of computing resources for operation than the provisional inference model.

20. The data aggregator of claim 16, wherein the operations further comprise:
    obtaining, by the data aggregator, the portion of the data using a reduced-size representation of the portion of the data from the data collector without receiving the portion of the data from the data collector.

* * * * *